June 27, 1950 — E. H. COOLEY — 2,513,004
SHIP'S HULL CONSTRUCTION
Filed Sept. 14, 1945 — 4 Sheets-Sheet 1
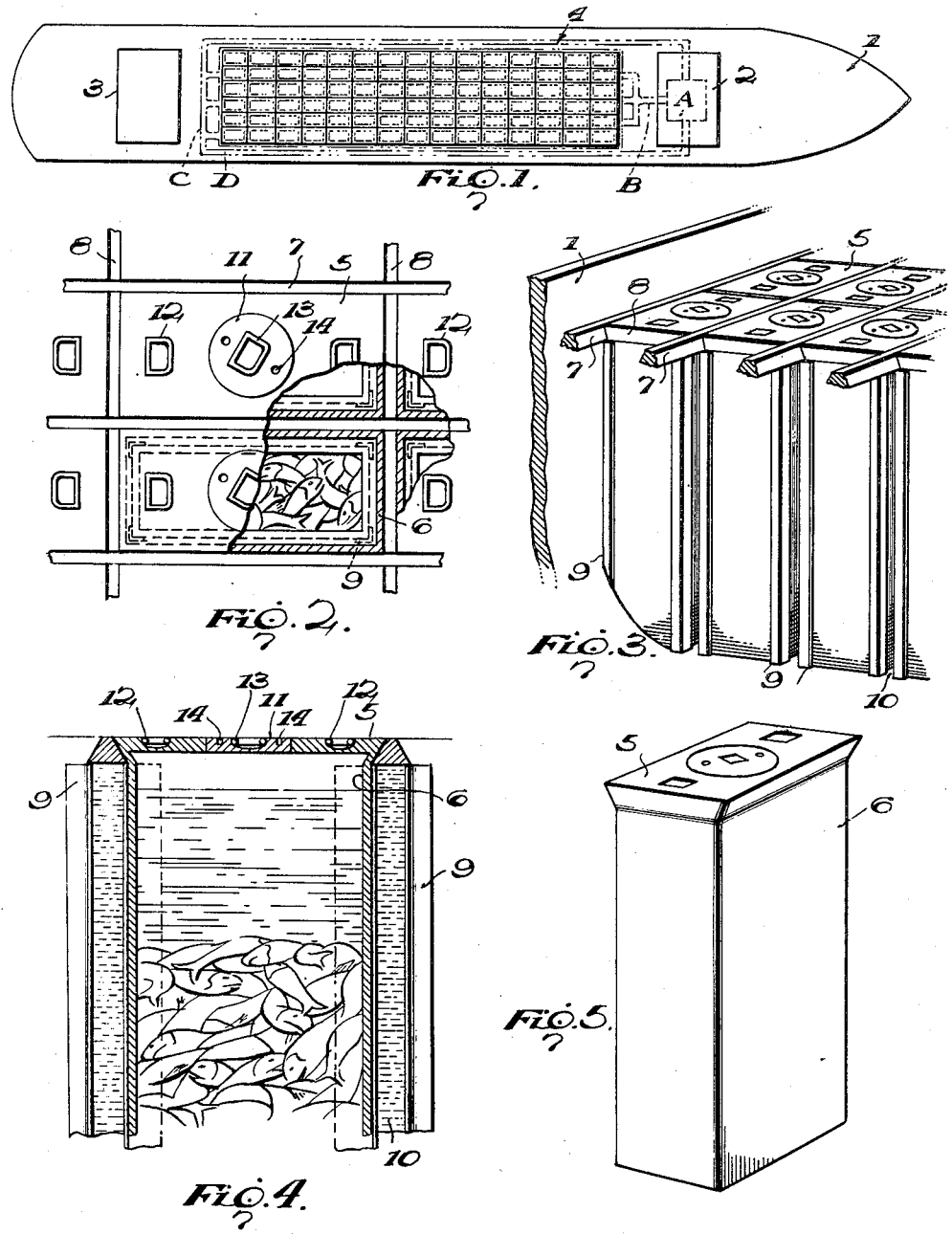
INVENTOR.
Edward H. Cooley
BY Albert H. Kirchner,
Attorney.

June 27, 1950 E. H. COOLEY 2,513,004
SHIP'S HULL CONSTRUCTION
Filed Sept. 14, 1945 4 Sheets-Sheet 2
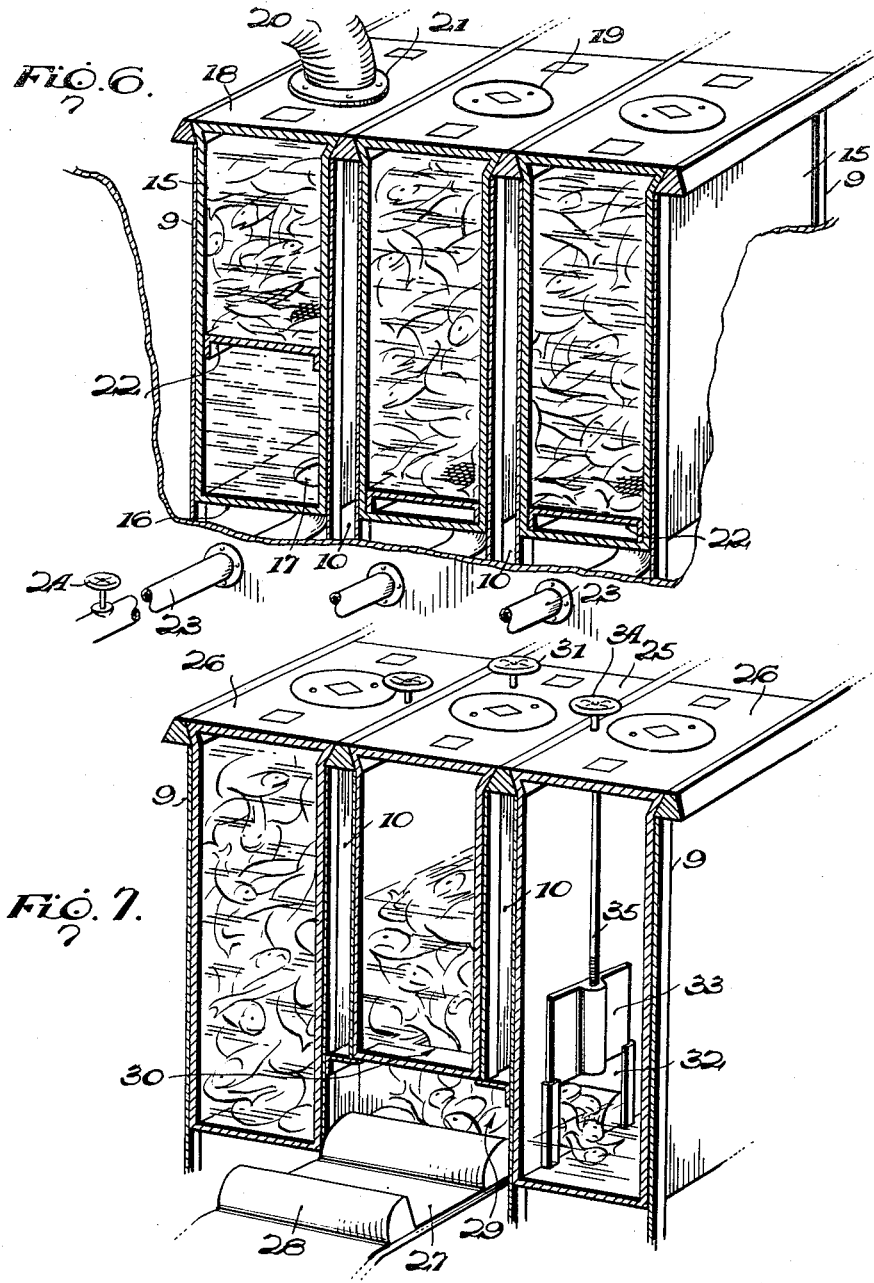
INVENTOR.
Edward H. Cooley
BY Albert H. Kirchner,
Attorney.

June 27, 1950          E. H. COOLEY          2,513,004
SHIP'S HULL CONSTRUCTION
Filed Sept. 14, 1945          4 Sheets-Sheet 3
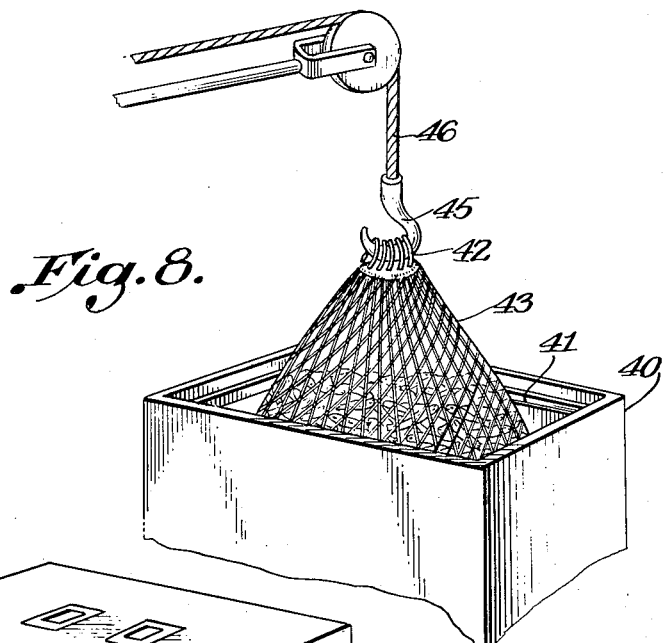
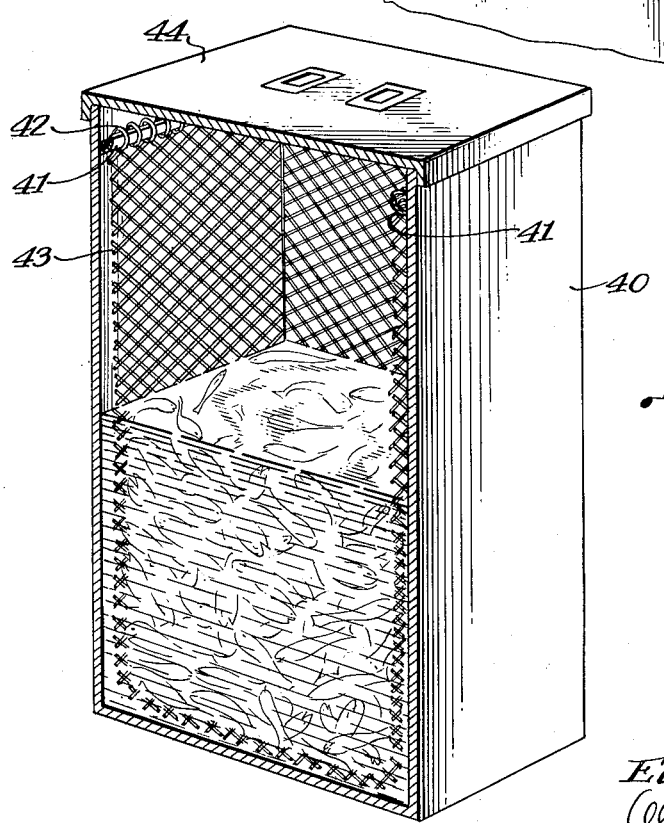
Inventor:
EDWARD H. COOLEY.
By Albert H. Kirchner
Attorney.

June 27, 1950  E. H. COOLEY  2,513,004
SHIP'S HULL CONSTRUCTION
Filed Sept. 14, 1945  4 Sheets-Sheet 4
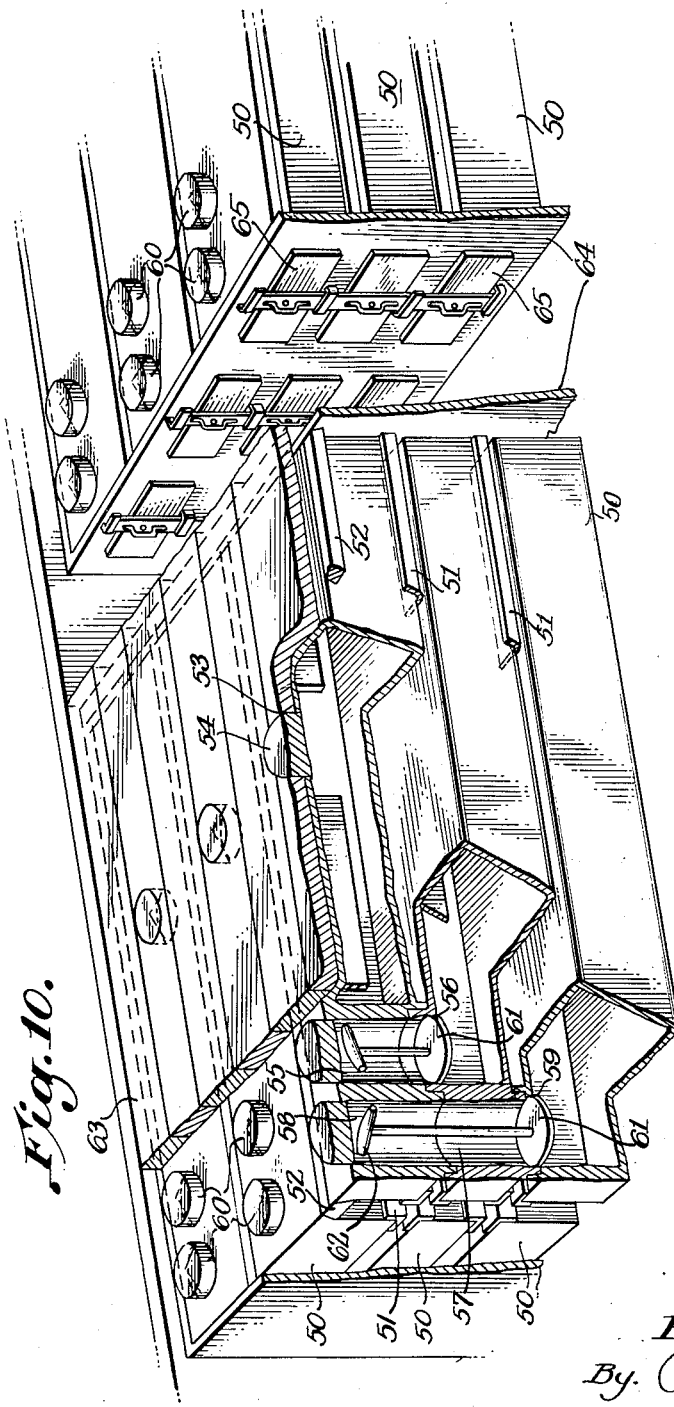
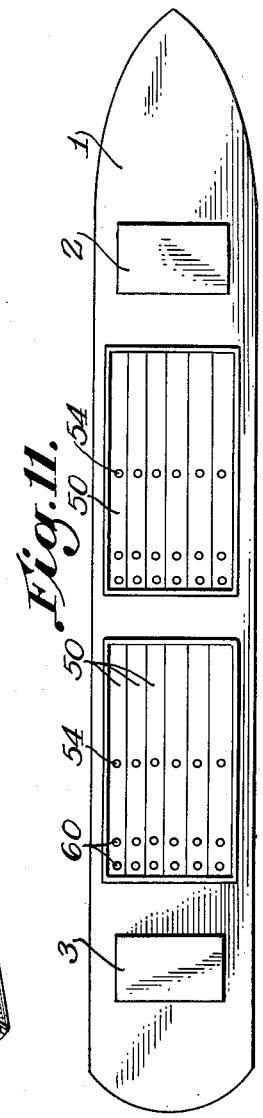
Inventor
EDWARD H. COOLEY.
By Albert H. Kirchner
Attorney.

Patented June 27, 1950

2,513,004

UNITED STATES PATENT OFFICE 2,513,004

SHIP'S HULL CONSTRUCTION

Edward H. Cooley, West Newton, Mass.

Application September 14, 1945, Serial No. 616,211

19 Claims. (Cl. 114—0.5)

The present invention relates to ship's hull constructions and more particularly provides an improved type of hold structure for trawlers and the like by which a catch of fish may be stowed and unloaded with great facility and may be kept under refrigeration if desired.

According to present practices, freshly caught fish in either whole or gutted condition, are stowed in the holds of fishing vessels, sometimes under refrigeration and sometimes without refrigeration. The ordinary type of refrigeration is cracked, crushed or flaked ice which is intermixed with the fish or spread in layers between them. The shortcomings of such methods as these are obvious and have long been tolerated by the industry despite considerable loss through spoilage in warm weather, the high cost of unloading the fish by hand labor using shovels or pitchforks and baskets, and other factors.

The present invention provides a novel ship construction by which freshly caught fish are stowed in separate fixed or removable compartments or containers which form an integral part of the hull and its decking and from which the fish are removed by forcible discharge through a conduit or by a conveyor, or which can be detached from the hull and dumped.

An important feature of the present invention comprises providing for refrigeration of the fish in the compartments or containers by a refrigerant which is circulated around the compartments or containers in conductive contact with the fish, but not in direct contact with them, so that the fish are kept at low temperature and free from contamination such as commonly occurs under present practices.

Another important object is to provide means for stowing fish or similar lading in closed compartments containing a liquid in which the fish or the like will be buoyed up so that those in the region of the bottoms of the compartments will not be crushed or in any way damaged by the weight of those above.

Other and further objects and advantages of the invention will be evident to those skilled in the art from the disclosure hereinafter of certain preferred embodiments.

In the accompanying drawings, which illustrate the preferred embodiments which are disclosed in compliance with the patent statutes merely for the purpose of exemplifying the invention and not with the intention of limiting the scope of the appended claims to the specific illustrated embodiments, Fig. 1 is a diagrammatic plan view of a vessel constructed in accordance with one form of embodiment of the principles of the invention;

Fig. 2 is a fragmentary plan view of a deck of the vessel partly broken away to show the interior of the fish-holding receptables;

Fig. 3 is a detail perspective view showing the arrangement of the removable containers in the hull of the ship;

Fig. 4 is a vertical sectional view through the upper portion of one of the containers showing its relation to the separating frames, including the refrigerant passageways;

Fig. 5 is a perspective view of one of the removable containers;

Fig. 6 is a transverse vertical sectional view through a portion of a ship's hull showing a modified type of construction including fixed compartments which are unloaded by use of a discharge conduit;

Fig. 7 is a similar view illustrating a further modified type of structure, in which fixed compartments are unloaded by a conveyor;

Fig. 8 is a perspective view of a still further modified type of container, from which the fish are removed by means of an inner net;

Fig. 9 is a view, partly in perspective and partly in vertical section, of the container of Fig. 8, showing the fish and the net in place therein, with the container closed;

Fig. 10 is a perspective view, partly broken away, showing a still further modified type of construction, in which fixed compartments are arranged to discharge into an interposed well from which the fish may be removed through a hatchway; and Fig. 11 is a diagrammatic plan view of a vessel provided with the compartments of Fig. 10.

Referring now to the drawings and first to Fig. 1, the reference numeral 1 designates generally the hull of a fishing vessel. Diagrammatically shown at 2 and 3 are forward and after deck houses which may cover crew quarters, operating machinery and the usual appurtenances of seagoing ships. Diagrammatically indicated at 4 as an entirety are the juxtaposed covers or lids 5 of a plurality of individual receptacles or containers 6, preferably arranged in such a way that all the covers of the series are flush in the plane of the ship's deck.

Each container 6 in the embodiment shown on sheet 1 of the drawings (Figs. 2-5) is a tank or box made of stout water-tight boards or metal having a closed bottom and side walls and being generally prismatic in shape, so that it is rectangular in cross section. Each container has an over-slung extreme top portion, which may be made in the form of a right angular, outwardly projecting shoulder or, as is preferred and as is shown in the drawing, in the form of inwardly and downwardly bevelled side and end walls. In either case the container is adapted to be hung on a pair of complementally shaped horizontal side framing members 7 and a pair of similarly shaped transverse framing members 8, all rigidly fixed in the hull of the ship as part of its bracing structure.

Stanchions 9, in the form of upright angle irons, are secured in the floor of the hull and to the intersections of the framing members 8 and 9, to stay the containers 6 which are adapted to fit reasonably snugly down into the guide ways formed by each set of four stanchions 9.

It will be appreciated that this construction provides a space 10 completely surrounding each container 6 and separating it from the wall of each adjacent container. This space is conveniently made about as wide as the thickness of the framing members 7 and 8 which surmount the stanchions 9, and all the spaces 10 in the hold are intercommunicating.

The top 5 of each container preferably includes a perimetric marginal portion which is fixed to the side and end walls of the container, so that in effect it is integral with those walls, and this fixed portion of each top is provided with a central opening having a cooperating closure plug 11. The lading, which will be fresh fish or the like, is stowed in the containers through the top openings, preferably with a quantity of liquid such as water brought up to a salt content of about three percent, with or without some bactericide, sterilizing agent, or preserving substance, such as sodium benzoate, in solution, as may be desired, and the plugs 11 are secured in place by any appropriate fastening means. I prefer to employ coarse interrupted screw threads for securing the plugs in place, so that they can be inserted and removed by a quarter or half turn of the cooperating threads, much like the action of a gun breech block.

If the lading in the containers is to be refrigerated, a refrigerant, such as brine or the like, is circulated through the spaces 10 between the containers by suitable pumping means mounted at any convenient location in the vessel, and the recirculated refrigerant is kept cold by any conventional type of refrigerating machinery. The pumping and refrigerating machinery is shown diagrammatically at A beneath the forward deck house 2 in Fig. 1, connected to a header B supplying ports in the forward bulkhead of the hold, and a return header is shown at C connected to similar ports in the after bulkhead of the hold and to return mains D through which spent refrigerant is conducted back along the deck or in the bilges to the refrigerating and pumping machinery. All the machinery is conventional and well known and need not be particularly described.

The fixed portion of each top 5 is provided with one or more handles or eyes 12 for the reception of hooks carried by a hoisting line by which each container 6 may be lifted from its mounting between four of the stanchions 9 and may be lowered back into place. Each plug 11 is similarly provided with a handle 13 and diametrically spaced sockets 14 for the reception of a tool like a spanner wrench by which the plug may be rotated into and out of closing relation with the top 5.

It will be appreciated that with all the containers 6 in place in the hold, a substantially flush deck structure is provided by their combined tops and the intervening framing members 7 and 8. It will also be evident that when fish or the like are to be stowed, it is only necessary to remove the several plugs 11 to admit the fish, with or without water as has been explained. When the several plugs are restored to place, the lading is safely stowed and protected, and can be readily discharged when the vessel arrives at port by pulling each container from its position and dumping its contents through its top opening.

At this point it may be observed that by charging water or other liquid into the containers with the fish, not only is dumping greatly facilitated, since by pouring out the water the fish are more readily flushed out of the containers, but, because the fish are naturally of nearly the same specific gravity as the liquid, they are well buoyed up in it and those in the lower portions of the containers are not crushed or otherwise damaged by the weight of those above. The water in the containers also serves the useful purposes of conducting cold to the fish (or, more strictly, abstracting heat therefrom and conveying it to the container walls and thence to the circulating refrigerant), keeping the fish wet, and, in a preferred embodiment of the invention, distributing salt or other chemical treating substances equally to all the fish.

An important feature of the invention resides in the adaptability of the framing and stanchion arrangement to be used for stowing fish or the like without the removable containers 6 and without the circulation of any refrigerant. In such use of the structure the containers are all removed and pen-boards are set in place between oppositely facing stanchions so that these pen-boards define lading spaces separated from each other. The openings in the deck are then filled in with deck squares.

Fig. 6 illustrates a modification in which the stanchions and framing member structure hereinabove described is retained without change but in which the containers are permanently secured in place. In this embodiment of the invention, each container or compartment 15 has a fixed bottom 16 provided with an opening 17, and each compartment top 18 has a central opening normally closed by a plug 19 which may be made like the plug 11 of the container 6. A discharge conduit, best made in the form of a large diameter canvas hose 20, has a flanged end fitting 21 screw threaded or otherwise appropriately formed to interfit in the top opening in substitution for the plug 19. The fish or other lading, which has been introduced through the top opening of a compartment, along with a quantity of water or other liquid, is discharged by elevating, in the container, a plunger 22 in the form of a false bottom which normally rests on the bottom 16, as shown in the case of the two right hand compartments in Fig. 6, but which can be forced upwardly by the pressure of water or the like introduced through the bottom opening 17 from a pipe 23 which is connected to that opening and is controlled by a valve 24. Each plunger 22 is provided with depending edge flanges which fit fairly snugly against the walls of the compartment so that the plunger will rise and fall without binding. The fit of the plunger is such that some of the water introduced through pipe 23 will pass the plunger and be discharged with the fish through pipe 20, thus facilitating discharge of the solid lading. If desired or thought necessary, holes may be drilled through the plungers to increase their ability to transmit water, and I propose in some cases to equip the plungers with valved ports which will become opened when the plungers reach the tops of the compartments so that a greatly increased flow of water will then be had through the plungers so as to flush the last of the fish through the discharge conduit 20.

Such valved ports, which are not shown in the drawings, can be readily provided in the form of an opening in each plunger normally closed by a plate spring pressed across the bottom of the plunger, with pins passing upwardly through small perforations in the plunger and projecting from the plunger top surface. These pins will engage the compartment top and be thereby pushed down through the rising plunger to unseat the plate as the water pressure continues, so that a greatly increased flow of water will take place through the open port and flush with it the last of the fish from the compartment.

The several pipes 23, one of which is connected to the bottom of each compartment, may be arranged as branches from a single main, and a valve 24 will be provided at some convenient location on the deck or elsewhere to control the flow through each branch so that the compartments can be discharged independently and selectively as the conduit 20 is moved from one to another.

Fig. 7 illustrates a further modification in which the compartments are permanently fixed in position and discharged on to a conveyor, preferably one of the endless belt type, which may lead directly up to the deck level or to a marine leg or other vertical elevating means provided in a hatchway.

In this form of construction the framing and stanchion elements are arranged as hereinbefore described, and all the compartments are permanently fixed in place, much like the compartments 15 of Fig. 6. However, all the compartments in one line, preferably those in a series extending along the longitudinal axis of the ship, are made more shallow than the other compartments, so that a tunnel is provided beneath the line of shallow compartments. In Fig. 7 one of the shallow compartments is shown at 25, and two of the deeper compartments are shown at 26. An endless belt conveyor 27, having conventional flights 28, is mounted in the tunnel 29 formed by the sides of the compartments 26 and the bottoms of the compartment 25.

All the compartments are provided with normally closed openings through which the fish may be discharged. Each shallow compartment 25 has a port 30 in its bottom which is normally closed by a bottom plate slidably mounted on the under side of the compartment bottom and controlled by a handle 31 extending up through the top of the compartment. When this handle is operated, the port 30 is opened and the fish in the compartment 25 fall on to the conveyor 27 for movement out of the hold. When all of the compartments 25 have thus been discharged, the adjacent compartments 26 will be discharged. This is accomplished by providing each of the compartments 26 with a port or opening 32 in its side wall which defines the tunnel 29 and by associating with this port a vertically slidable closure plate 33 operated by a handle 34 which extends up through the top of the compartment. As shown in Fig. 7, this construction may take the form of guideways at the vertical edges of the port 32 receiving the margins of the plate 33 which is elevated and lowered in the guideways by rotation of a rod 35 which is screwthreaded into the plate. Of course, specifically different closures and operating means may be substituted for those which are herein disclosed simply as recommended examples.

It will be obvious that when the plate 33 is elevated, as shown in Fig. 7, fish will fall by gravity through the port 32 and be deposited on the conveyor 27. If the ship is large enough to have more than one line of deep compartments 26 provided along either side of the tunnel 29, each compartment 26 which intervenes between the tunnel and another compartment 26 will have both of its side walls provided with ports 32 and closure plates 33. The first intervening compartment is first discharged by opening its port 32 on the tunnel side. Then its port 32 on the outboard side is opened and the adjacent port 32 of the adjoining outboard compartment 26 is also opened. This provides a passageway for fish from the outer compartment through the emptied intervening compartment, and in this way all the compartments are successively discharged. Of course, in order to exclude refrigerant from the deep compartments in such an arrangement, the juxtaposed ports 32 of each pair of such compartments are provided with a watertight framing or short conduit connecting them. An obvious modification of the described arrangement consists in locating a single closure plate 33 in each of such framings or conduits, instead of providing a closure plate in the port at each end of the framing or conduit.

If it is found that some few fish remain in the bottoms of the compartments after flow by gravity on to the conveyor ceases, these last few remaining fish can be flushed out of the compartments and on to the conveyor by a stream of water played through the top openings through which the compartments were loaded.

In the Fig. 7 embodiment, as in the other embodiment, shown in Fig. 6, in which the compartments are fixed permanently in the hold, the compartments are spaced from each other and in effect jacketed by intercommunicating spaces through which a refrigerant may be circulated by the means indicated at A, B, C and D in Fig. 1. As is shown in Fig. 7, the jacketing may be shortened and omitted in the region of the tunnel 29, but of course it would be a simple matter of design to extend the jacketing over, under and along the sides of the tunnel, if desired. For all practical purposes, however, the arrangement shown in Fig. 7 will be found satisfactory, since the refrigerating effect of jackets extending along the full extent of each of the four side walls of the shallow compartments 25, and along most of the area of the four side walls of each of the deeper compartments 26, is sufficient to keep all the lading in all the compartments down to adequately low temperatures.

Figs. 8 and 9 show another embodiment of the invention in which a plurality of containers are fixed more or less permanently in the hold. In these figures it will be observed that each of such containers, designated 40, is provided in the region of its inside top with a ledge 41 from which are hung a series of hooks 42 which are permanently secured to the open mouth of a net or bag 43 which conforms generally in shape and size to the container and which fills it as a sort of lining. The container is normally kept covered by a removable lid 44 and is filled by dumping fish and water through the open mouth of the bag. The fish are discharged by removing the hooks 42 from the ledge 41 and gathering them on to the hook 45 of a cable 46 which is pulled up by any suitable winch, boom or the like as indicated in Fig. 8. This operation of course removes the fish and leaves the water in the containers for re-use after the bags are replaced, or the water may be pumped out and replaced. As will be appreciated, a draw-string may be employed to close the mouth of the bag and to be engaged with the hook 45, or other means may be used to hang the bag in the container and to cooperate in its removal therefrom. Of course, in this form of the invention, as in all the others, the containers are jacketed by refrigerant which is circulated between and around them in the hold.

Fig. 10 illustrates a further modification. Here the containers 50 are more or less permanently secured in superposed horizontal tiers in the hold, separated and supported by fixed angle irons 51 and upper framing members 52 which provide spaces for a circulating refrigerant. The long dimension of each container is horizontal, and they are provided with inlet and discharge openings. In the illustrated structure, three tiers are shown, but of course this number may be increased or decreased for holds of different depth. Each upper tier container has an inlet opening 53, normally closed by a plug 54, and each upper tier container is penetrated by a vertical well passing completely through the container and providing access to the corresponding opening of the container immediately beneath it. Where the construction includes three superposed containers, as in Fig. 10, the uppermost container is provided with two such wells, and the intermediate container is provided with one such well. As will be understood, any larger number of superposed containers will require a corresponding increase in the number of wells, all to the end that the inlet opening of each container beneath those of the upper tier can be reached through the containers which are above it.

Thus, in the illustrated embodiment, each upper container has a well 55 covering the opening 56 of the immediately subjacent container, and this latter container has a well 57 registering with a second well 58 in the upper container to provide access to the opening 59 of the lowermost container.

In order to keep refrigerant, which circulates through the spaces between the containers, from entering the containers, the several wells are sealed to the container walls, as shown in the figure.

The plug 54 suffices to close the inlet opening 53 of each uppermost container. The wells of this container are closed by similar plugs 60, and the wells contain closure plates 61, each provided with an upstanding handle 62, for sealing the inlet openings 56 and 59 of the lower containers. The uppermost containers may be covered by decking 63. The containers are arranged in banks built up against transverse bulkheads 64 spaced to form a sump between them, directly beneath a hatchway. Each container has a discharge opening through the adjacent bulkhead 64, which is normally closed by a suitably gasketed door or other cover 65. The particular form of this closure 65 is not important as long as it can be readily opened and closed in watertight relation to its container.

Fish and water are charged into the containers through their several inlet openings and are discharged by gravity, into the sump, after opening the doors 65. The material is removed from the sump, up through the hatchway, by any suitable means, such as a marine leg, pump or the like.

Fig. 11 is similar to Fig. 1 but shows diagrammatically the plan appearance of a hull provided with the container construction shown in Fig. 10, with the decking removed to show the sump. It is to be understood that the refrigerating machinery, pumping machinery, and various connecting conduits explained in connection with Fig. 1 will be employed also in the Figs. 10 and 11 construction.

It is believed that the structure, uses and principal advantages of the hull provided by the present invention will, from the foregoing description of certain preferred embodiments, be sufficiently clear to those skilled in the art. It is to be understood that the mechanical details and specific arrangements and relations of parts are subject to variation and differences of design and selection, and that not all of the several features need be used in the particular combinations and relations shown.

I claim:

1. A ship's hull construction for a lading of the nature of fresh fish in water comprising a plurality of watertight containers for the lading, means mounting said containers in mutually spaced relation in the hull, top closures for the containers flush with each other and with the mounting means forming a substantially continuous deck, and means for circulating a refrigerant through the hull in heat-conductive relation to said containers.

2. A ship's hull construction for a lading of the nature of fresh fish in water comprising a plurality of independent and separately removable watertight containers for the lading, framing members fixed in the hull structure separating the containers, top closures for the containers flush with each other and with the framing members forming a substantially continuous deck, and means for circulating a refrigerant through the hull in heat-conductive relation to the containers.

3. A ship's hull construction for a lading of the nature of fresh fish in water comprising a hold, framing members fixed in the hold including horizontal beams mounted right angularly with relation to each other in substantially the plane of a deck of the ship, and a plurality of independent watertight containers for the lading mounted independently of each other on and supported by the framing members with their lower portions depending into the hold and with closed tops forming part of said deck.

4. A ship's hull construction for a lading of the nature of fresh fish in water comprising a hold, framing members fixed in the hold including horizontal beams mounted right angularly with relation to each other in substantially the plane of a deck of the ship, a plurality of independent watertight containers for the lading mounted independently of each other on and supported by the framing members with their lower portions depending in mutually spaced relation into the hold, top closures for the containers co-planar with said framing members cooperating therewith to form part of said deck, and means for circulating a refrigerant through the hold in heat-conductive relation to said containers.

5. A ship's hull construction for a lading of the nature of fresh fish in water comprising a plurality of independent and separately removable watertight containers for the lading, framing members fixed in the hull structure separating the containers, means for circulating a refrigerant through the spaces separating the containers, covers secured to the containers, and means carried by the covers for separable connection with a hoisting hook for elevating the containers individually from between said framing members.

6. A ship's hull construction for a lading of the nature of fresh fish in water comprising a plurality of independent and separately removable watertight containers for the lading, framing members fixed in the hull structure separating the containers, means for circulating a refrigerant through the spaces separating the containers, covers having portions permanently secured to the containers, means carried by said portions of the covers for separable connection with a hoisting hook for elevating the containers individually from between said framing members, and removable closures mounted in ports in said portions of the covers through which the containers may be loaded when in place between the framing members and unloaded when removed therefrom, said closures being flush with each other and with the covers and the framing members to form therewith a deck surface.

7. The structure claimed in claim 3, in which the framing members have outwardly and downwardly beveled sides, and in which the upper portions of the containers have complementally outwardly and upwardly beveled sides seated on said sides of the framing members.

8. A ship's hull construction for a lading of the nature of fresh fish comprising a compartment mounted in said hull, said compartment being of uniform cross section throughout its vertical extent, a ported bottom in said compartment, a plunger mounted in said compartment above said ported bottom in lading-tight relation to the sides of the compartment, and means for introducing fluid under pressure through the ported bottom to elevate the plunger and thereby discharge lading from the top of the compartment.

9. A ship's hull construction for a lading of the nature of fresh fish comprising a plurality of compartments mounted in said hull, each compartment being of uniform cross section throughout its vertical extent, a ported bottom in each compartment, a plunger mounted in each compartment above said ported bottom in lading-tight relation to the sides of the compartment, and means for introducing fluid under pressure through the ported bottom to elevate the plunger and thereby discharge lading from the top of the compartment.

10. A ship's hull construction for a lading of the nature of fresh fish comprising a plurality of compartments mounted in mutually spaced relation in said hull, each compartment being of uniform cross section throughout its vertical extent, means for circulating a refrigerant through the spaces separating said compartments, a ported bottom in each compartment, a plunger mounted in each compartment above said ported bottom in lading-tight relation to the sides of the compartment, and means for introducing fluid under pressure through the ported bottom to elevate the plunger and thereby discharge lading from the top of the compartment.

11. A ship's hull construction for a lading of the nature of fresh fish comprising a plurality of compartments mounted in said hull, each compartment being of uniform cross section throughout its vertical extent, a discharge opening provided in the top of each compartment adapted to have a discharge conduit connected thereto, a ported bottom in each compartment, a plunger mounted in each compartment above said ported bottom in lading-tight relation to the sides of the compartment, and means for introducing fluid under pressure through the ported bottom to elevate the plunger and thereby force lading from the compartment through the discharge conduit.

12. A ship's hull construction for a lading of the nature of fresh fish comprising a plurality of compartments mounted in said hull, each compartment being of uniform cross section throughout its vertical extent, a discharge opening provided in the top of each compartment adapted to have a discharge conduit connected thereto, a ported bottom in each compartment, a plunger mounted in each compartment above said ported bottom in lading-tight relation to the sides of the compartment, a fluid pressure system including pipes connected to the several ported bottoms, and means for controlling independently the pressure of fluid in said pipes whereby the several plungers may be selectively elevated and the several compartments selectively discharged through said discharge conduits.

13. A ship's hull construction for a lading of the nature of fresh fish comprising a plurality of compartments mounted in said hull, each compartment being of uniform cross section throughout its vertical extent, a discharge opening provided in the top of each compartment, a ported bottom in each compartment, a plunger mounted in each compartment above said ported bottom in lading-tight relation to the sides of the compartment, and means for introducing water under pressure through the ported bottom to elevate the plunger and thereby force lading through the discharge opening, said plunger being adapted to pass a portion of said water for discharge with said lading.

14. A ship's hull construction for a lading of the nature of fresh fish comprising a plurality of compartments mounted in said hull, each compartment being of uniform cross section throughout its vertical extent, a discharge opening provided in the top of each compartment, a ported bottom in each compartment, a plunger mounted in each compartment above said ported bottom in lading-tight relation to the sides of the compartment, means for introducing water under pressure through the ported bottom to elevate the plunger and thereby force lading through the discharge opening, and means cooperating with the plunger to pass water beyond the plunger and through the discharge opening when the plunger reaches the top of the compartment.

15. A ship's hull construction for a lading of the nature of fresh fish comprising a plurality of compartments mounted side by side and end to end in said hull, certain of said compartments being arranged in alignment and certain other compartments being arranged along the sides of said line and extending deeper into the hull whereby a tunnel is formed beneath the first named compartments and between said other compartments, conveyor means located in said tunnel, and selectively openable closure means provided in the bottoms of the first named compartments and in the adjacent side walls of said other compartments whereby lading from all the compartments may be conducted selectively by gravity into said tunnel and on to said conveyor means.

16. A ship's hull construction for a lading of the nature of fresh fish comprising a plurality of compartments mounted side by side and end to end in said hull, certain of said compartments being arranged in alignment and certain other compartments being arranged in parallel lines along opposite sides of said aligned compartments and extending deeper into the hull whereby a tunnel is formed beneath the first named compartments and between plural lines of said other compartments, conveyor means located in said tunnel, and selectively openable closure means provided in the bottoms of the first named compartments and in the side walls of said other compartments whereby lading from the first named compartments may be conducted selectively by gravity into said tunnel and on to said conveyor means and whereby lading from said other compartments may be conducted laterally by gravity selectively through intervening opened closure means into said tunnel and on to said conveyor means.

17. A ship's hull construction for a lading of the nature of fresh fish comprising a plurality of compartments mounted side by side and end to end in said hull, mutually intercommunicating jackets fixed in the hull structure in heat-conductive relation to the compartments, means for circulating a refrigerant through said jackets, certain of said compartments being arranged in alignment and certain other compartments being arranged along the sides of said line and extending deeper into the hull whereby a tunnel is formed beneath the aligned compartments and between said other compartments, conveyor means located in said tunnel, and selectively openable closure means provided in the bottoms of the aligned compartments and in the adjacent side walls of said other compartments whereby lading from all the compartments may be conducted selectively by gravity into said tunnel and on to said conveyor means.

18. A ship's hull construction for a lading of the nature of fresh fish comprising a plurality of framing members fixed in the hull including spaced transverse beams and spaced vertical stanchions forming a plurality of juxtaposed vertical wells and a plurality of independent, removable containers for the lading and pen-boards for partitioning the wells from each other receivable selectively in the wells.

19. A ship's hull construction for a lading of the nature of fresh fish comprising a plurality of containers for the lading arranged in superposed tiers forming a plurality of banks horizontally spaced apart to provide a sump between opposed banks, means mounting the containers of each bank in mutually spaced relation for circulation of a refrigerant through the hull in heat conductive relation to the containers, normally closed inlet passageways in the containers of each lower tier accessible through wells formed in the container of each upper tier, and closures provided on the containers adapted to be opened for discharging the lading into the sump.

EDWARD H. COOLEY.

REFERENCES CITED

The following references are of record in the file of this patent:

UNITED STATES PATENTS

| Number | Name | Date |
|---|---|---|
| 485,836 | Briggs | Nov. 8, 1892 |
| 664,288 | Pratt | Dec. 18, 1900 |
| 899,057 | Kleinschmidt | Sept. 22, 1908 |
| 1,154,836 | Beckman | Sept. 28, 1915 |
| 1,533,366 | Bathe | Apr. 14, 1925 |
| 1,805,354 | Birdseye | May 12, 1931 |